US009030926B2

(12) United States Patent
Han et al.

(10) Patent No.: US 9,030,926 B2
(45) Date of Patent: May 12, 2015

(54) PROTOCOL INDEPENDENT MULTICAST LAST HOP ROUTER DISCOVERY

(75) Inventors: Lin Han, San Jose, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 287 days.

(21) Appl. No.: 13/531,283

(22) Filed: Jun. 22, 2012

(65) Prior Publication Data

US 2012/0327764 A1 Dec. 27, 2012

Related U.S. Application Data

(60) Provisional application No. 61/499,987, filed on Jun. 22, 2011.

(51) Int. Cl.
*H04L 12/761* (2013.01)
*H04L 12/18* (2006.01)

(52) U.S. Cl.
CPC ........... *H04L 12/185* (2013.01); *H04L 12/1877* (2013.01); *H04L 12/1881* (2013.01)

(58) Field of Classification Search
None
See application file for complete search history.

(56) References Cited

U.S. PATENT DOCUMENTS

| | | | | |
|---|---|---|---|---|
| 6,965,883 | B2 * | 11/2005 | Xu et al. | 705/418 |
| 7,715,329 | B1 * | 5/2010 | Breslau et al. | 370/255 |
| 7,788,368 | B1 * | 8/2010 | Scano et al. | 709/224 |
| 7,958,238 | B1 * | 6/2011 | Batz et al. | 709/225 |
| 8,009,671 | B2 * | 8/2011 | Guo et al. | 370/390 |
| 8,144,628 | B2 * | 3/2012 | Previdi et al. | 370/256 |
| 2007/0153790 | A1 * | 7/2007 | Boers et al. | 370/390 |
| 2011/0019534 | A1 * | 1/2011 | Ramakrishnan et al. | 370/217 |

OTHER PUBLICATIONS

Adams, A., et al., "Protocol Independent Multicast-Dense Mode (PIM-DM): Protocol Specification (Revised)," RFC 3973, Jan. 2005, 61 pages.
Fenner, B., et al., "Protocol Independent Multicast-Sparse Mode (PIM-SM): Protocol Specification (Revised)," RFC 4601, Aug. 2006, 112 pages.
Bhattacharyya, S., Ed., "An Overview of Source-Specific Multicast (SSM)," RFC 3569, Jul. 2003, 15 pages.
Handley, M., et al., "Bidirectional Protocol Independent Multicast (BIDIR-PIM)," RFC 5015, Oct. 2007, 44 pages.
Boers, A., et al., "The Protocol Independent Multicast (PIM) Join Attribute Format," RFC 5384, Nov. 2008, 11 pages.
Vida, R., Ed., et al., "Multicast Listener Discovery Version 2 (MLDv2) for IPv6," RFC 3810, Jun. 2004, 63 pages.
Cain, B., et al., "Internet Group Management Protocol, Version 3," RFC 3376, Oct. 2002, 54 pages.

(Continued)

*Primary Examiner* — Alex Skripnikov
(74) *Attorney, Agent, or Firm* — Conley Rose, P.C.; Grant Rodolph; William H. Dietrich

(57) ABSTRACT

Disclosed is an apparatus comprising a first network node configured to transmit a first message to a second network node, wherein the first message comprises data designating the first network node as a member of a first multicast channel, and wherein the first message comprises data indicating a network address a third network node that is designated as a last hop router (LHR) of the first multicast channel. Also disclosed is a method comprising sending, by a first network node, a protocol independent multicast (PIM) join message, wherein the PIM join message comprises the network address of a PIM channel last hop router (LHR).

12 Claims, 9 Drawing Sheets

500
531 Source 1
532 Source 2
547
548
505 NE 5
506 NE 6
546
545
541
542
543
544
501 NE 1
502 NE 2
503 NE 3
504 NE 4
Client 1 511
Client 2 512
Client 3 513
Client 4 514

(56) References Cited

OTHER PUBLICATIONS

Foreign Communication From a Related Counterpart Application, International Application No. PCT/US2012/043847, International Search Report dated Nov. 30, 2012, 3 pages.

Foreign Communication From a Related Counterpart Application, International Application No. PCT/US2012/043847, Written Opinion dated Nov. 30, 2012, 14 pages.

Estrin, D., et al., “Protocol Independent Multicast-Sparse Mode (PIM-SM): Protocol Specification,” Network Working Group, RFC 2362, Jun. 1998, 66 pages.

Boers, A., et al., “The Protocol Independent Multicast (PIM) Join Attribute Format,” Network Working Group, RFC 5384, Nov. 2008, 11 pages.

Bless, R., et al., “Advanced Quality-of-Service Signaling for IP Multicast,” IEEE, 2011, 9 pages.

Wang, X., et al., “IP Multicast Fault Recovery in PIM over OSPF,” ACM, SIGMETRICS 2000, Jun. 2000, pp. 106-107.

* cited by examiner

PROTOCOL INDEPENDENT MULTICAST LAST HOP ROUTER DISCOVERY

CROSS-REFERENCE TO RELATED APPLICATIONS

The present application claims further priority to U.S. Provisional Patent Application No. 61/499,987 filed Jun. 22, 2011 by Lin Han and Renwei Li, and entitled "Method of Protocol Independent Multicast Last Hop Router Discovery", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Protocol Independent Multicast (PIM) is a family of network routing protocols that provide one-to-many and many-to-many distribution of data over Internet Protocol (IP) networks. A network employing PIM may comprise interconnected network elements (NEs) that function as first hop routers (FHRs) and last hop routers (LHRs). A FHR may be connected to a multicast source or a rendezvous point (RP), while an LHR may be connected to a client device that receives data transmissions from a multicast source or sources. Each LHR may be associated with a multicast group address. A multicast source may transmit data to the LHRs by transmitting data to the multicast group address. Multicast groups may be dynamic and LHRs may continuously enter and leave the multicast group by becoming associated and dissociated with the multicast group address, respectively. As the multicast group address may be associated with a dynamic group of LHRs, the source and/or FHR may have no efficient method to determine the identity of the LHRs associated with the multicast group address at a given time.

SUMMARY

In one embodiment, the disclosure includes an apparatus comprising: a first network node configured to transmit a first message to a second network node, wherein the first message comprises data designating the first network node as a member of a first multicast channel, and wherein the first message comprises data indicating a network address a third network node that is designated as a LHR of the first multicast channel.

In another embodiment, the disclosure includes an apparatus comprising a first network node configured to receive a message from a second network node, wherein the message comprises data designating the second network node as a member of a multicast channel, and wherein the message comprises data indicating a network address of a third network node that is designated as a LHR of the multicast channel.

In yet another embodiment, the disclosure includes a method comprising sending, by a first network node, a PIM join message, wherein the PIM join message comprises the network address of a PIM channel LHR.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus for and method of performing LHR discovery in a multicast system. Specifically, a multicast system, such as PIM, may comprise a FHR connected to a multicast source, a plurality of intermediate nodes, and a plurality of LHRs. In order to join a multicast channel, the LHRs may be required to transmit PIM join messages toward the FHR through the intermediate nodes. The PIM join messages may be sent periodically or triggered by an event. Each PIM join message may comprise the unicast network address of the LHR sending the message. Each intermediate node may save the network addresses of all downstream LHRs, merge the PIM join messages, and forward the merged join message toward the FHR. The merged join message may comprise the unicast network addresses of all downstream LHRs in the multicast channel. The FHR and the intermediate nodes may store the addresses of the downstream LHRs in the channel and may forward the addresses to the source or a network management entity upon request or based on a condition. The multicast network components may use the addresses of the LHRs for locating failures, performing multicast accounting, and/or for transmitting PIM QoS fail messages.

Figure 1:
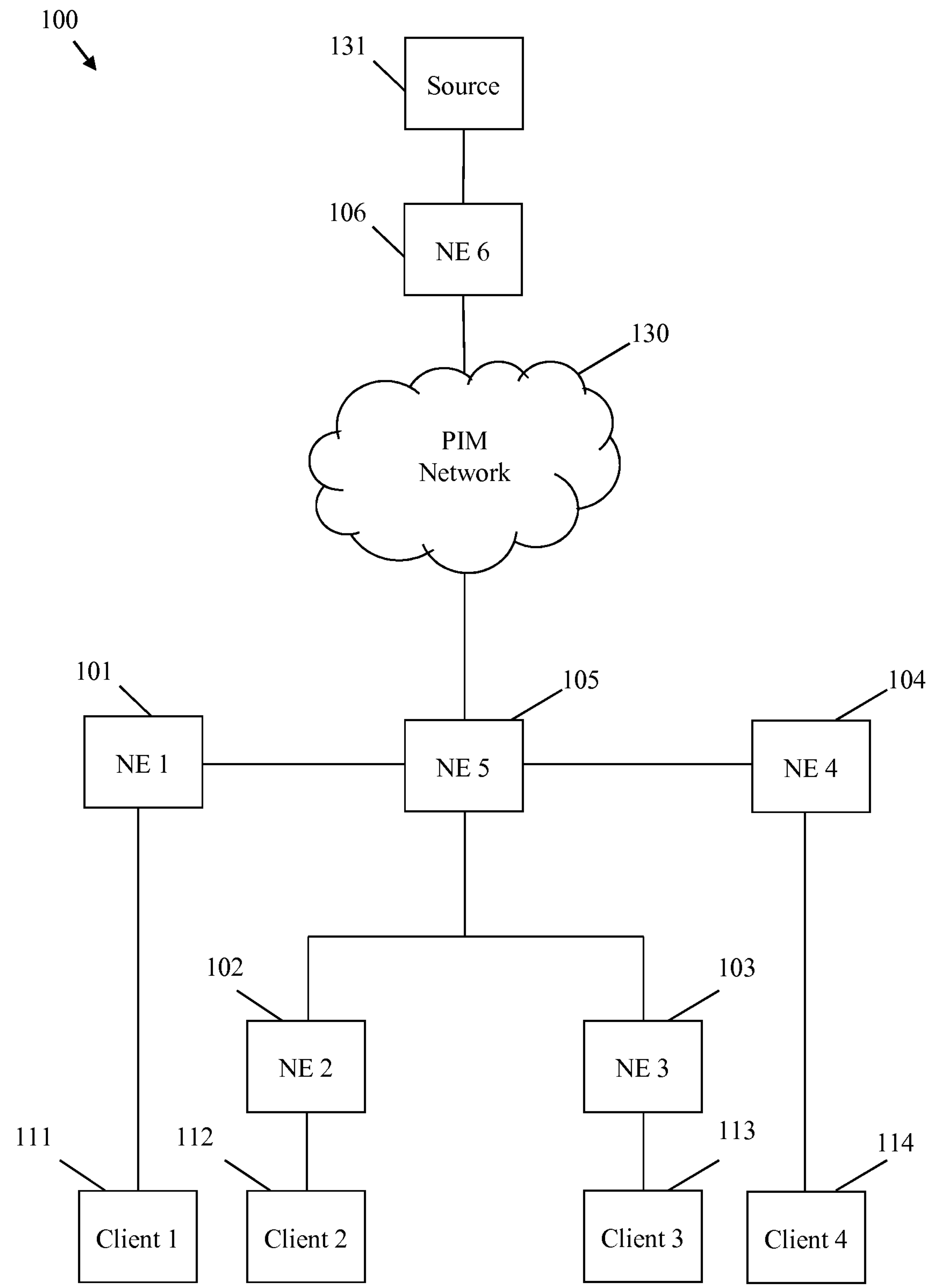
FIG. 1 is a schematic diagram of an embodiment of a network with NEs capable of employing PIM.

FIG. 1 is a schematic diagram of an embodiment of a network 100 with NEs capable of employing PIM. The network 100 comprises a source device 131 capable of sending data to and receiving data from client devices 111, 112, 113, and 114. The source device 131 may be connected to the client devices 111-114 through a plurality of NEs 101-106 and a PIM network 130. Specifically, the source device 131 may be connected to NE 106, which may be connected to the PIM network 130. NE 105 may connect NEs 101-104 to the PIM network 130. Client devices 111-114 may be connected to NEs 101-104, respectively. It should be understood that NEs 101-106 may be part of PIM network 130 and are shown for purposes of clarity. Each connection and/or interface between two NEs may be a PIM enabled connection/interface. Each connection and/or interface between a NE and a client device may be an IGMP/MLD enabled connection/interface. The connection/interfaces between source device 131 and NE 106 may be enabled for IGMP, MLD, PIM, or any other suitable transmission protocol.

The source device 131 may be a machine capable of transmitting data to and receiving data from client devices over an IP network, such as an internet content provider. Each NE may be a multicast router, or similar device, configured to receive, transmit, and/or process information using PIM channels denoted (S, G) and/or (*, G) where S denotes the IP address of a single source device, such as source device 131, G denotes the IP addresses of all NEs/client devices in a group that have requested data from the source, and * denotes the IP addresses of all source devices transmitting to G including any source device 131 and any source devices that may be located in the PIM network 130. Specifically, a NE may receive a communication from a source, sources, or an upstream NE, replicate the communication as needed, and transmit the communication to downstream NEs or client devices that wish to receive the communication. Each client device 111-114 may be capable of requesting and receiving data from the source device 131. Each client device 111-114 may be a single computer and/or server, a plurality of computers/servers connected by one or more switches and/or routers, mobile device, or any other device or devices commonly employed in host networks, local area networks (LANs), wide area networks (WANs), or similar networks. The Client devices 111-114 may enter and/or leave channel (S,G) and/or (*,G) based on whether a particular client device needs access to the data being transmitted from the source device 131 as discussed below.

Requested data may be transmitted from the source device 131 to one or more of the client devices 111-114 via NEs 101-106 and the PIM network 130. A plurality of data transmissions from a source device to a given client device may be referred to as a data stream. Data traveling from a source device to a client device may be referred to as moving in a downstream direction or downstream, while data traveling from a client device to the source device may be referred to as moving in a upstream direction or upstream. For example, data moving from source device 131 to any client device 111-114 travels downstream and data moving from any client device 111-114 to source device 131 travels upstream. NE 106 may be referred to as the FHR as NE 106 is the first router a message encounters when transmitted from the source device 131. NEs 101-104 may be referred to as LHRs as each of these NEs may be the last routers messages encounter when transmitted from the source device 131 to the client devices 111-114, respectively. The PIM network 130 may comprise any number of NEs connected in any topology. NEs 101-106 and PIM network 130 together constitute a PIM network. NEs 101-106 are shown for illustrative purposes.

As discussed above, a source 131 or sources may transmit data to one or more of the client devices 111-114. Such transmission may be accomplished by employing various routing methods, schemes, or protocols between the source 131, the FHR 106, the LHRs 101-104, and the client devices 111-114. The client devices 111-114 may communicate with the LHRs 101-104 via Internet Group Management Protocol (IGMP) versions one through three and Multicast Listener Discovery (MLD) versions one and two. Transmissions between the FHR 106 and the LHRs 101-104 may be accomplished by a multicast scheme such as PIM. Multiple variants of PIM may be employed including PIM Dense Mode (PIM-DM), PIM Sparse Mode (PIM-SM), PIM Source Specific Mode (PIM-SSM), and PIM Bidirectional Mode (PIM-BIDIR), as set forth in internet engineering task force (IETF) documents request for comments (RFC) 3973, RFC 4601, RFC 3569, and RFC 5015, respectively, which are hereby incorporated by reference.

PIM-DM may presume that all downstream nodes wish to receive content transmitted by a source 131. In PIM-DM, all data transmitted from the source 131 may initially be flooded to the entire network 100. A NE may receive a prune message from the NE's upstream neighbors and may send the prune message to the NE's downstream neighbors. If no response is received to indicate that a downstream neighbor node wishes to be a member of channel (*,G) and/or (S, G), the NE and the NE's downstream neighbors are to be removed from the channel. One or more of the NE's downstream neighbors may respond with a join message, which may be forwarded to the NE's upstream neighbors to prevent the NE and the NE's downstream neighbor from being removed from the channel. If a NE has been previously removed from the channel and a downstream neighbor wishes to enter the channel, the downstream neighbor may send a graft message to the NE, which may be forwarded to the NE's upstream neighbors and may cause the NE and the NE's downstream neighbors to enter the channel. A pruned state, e.g. no membership in the channel, may timeout causing the NE and the NE's downstream neighbors to reenter the channel. Prune messages may be sent periodically to allow the NE to remain out of the channel. Such prune messages may trigger more join messages.

In PIM-SM, a LHR may send a PIM join message toward a NE designated as an RP for the channel (S,G) and/or (*, G), via any intervening NEs. A NE may be statically or dynamically designated as an RP, depending on the embodiment. All NEs must join through the RP, the RP receives data from the source, and transmits the data downstream on behalf of the source. When a join message is sent from a LHR toward the RP, the join message may reach the RP or a NE that is already a member of the channel, at which point the LHR and any intervening NEs may become members of the channel. PIM messages from the source, through the RP, may travel back to the LHR through reverse path routing. This process may create an RP multicast tree, which may be rooted at the RP. Once the RP tree reaches a predetermined size, the RP tree may be converted to a Source Path Tree (SPT), which may allow packets to be routed directly from the source's FHR to the LHR. Join messages may be periodically refreshed by the members of the channel, and membership in the channel may timeout if no join message is sent from a given NE. PIM-BIDIR may function in a substantially similar manner to PIM-SM. However, PIM-BIDR may create a bidirectional tree between the source and the LHRs, which may pass though the RP. The bidirectional tree may not be converted to a SPT.

In PIM-SSM, a channel may be limited to a single source (S, G). A LHR wishing to join the channel may send a join message upstream to the FHR. Each NE receiving a join message my become part of channel (S, G). Join messages may be periodically refreshed by the members of the channel, and membership in the channel may timeout if no join message is received by an upstream NE.

Regardless of the version of PIM employed, a NE 101-104 may join or remain in a PIM channel by transmitting join messages upstream to a FHR connected to a source device 131 or a FHR functioning as an RP. The FHR may be NE 106 or may be a node in PIM 130 if the source or sources are located in PIM 130. For example, source device 131 may comprise two sources S1 and S2. Alternatively, source device 131 may comprise S1 and S2 may be located in the PIM network 130. Client devices 111 and 112 may wish to receive data from S1, while 113 and 114 may wish to receive data from S2. The client devices 111-114 may each request to join their respective channels by contacting the NEs 101-104 to which each client device is attached using IGMP, MLD, or a similar protocol. NE 101 and 102 may each send a join (S1, G1) message to NE 105. NE 103 and 104 may each send a join (S2, G2) message to NE 105. NE 105 may send a join (S1, G1) message and a join (S2, G2) message toward the FHR, e.g NE 106, through the PIM network 130 and/or to a FHR in the PIM network 130. NEs 101, 102, 105, and 106 may then become or remain members of (S1, G1) and NEs 103, 104, 105, and 106 may become or remain members of (S2, G2), where S1 is the IP address of source 1, S2 is the IP address of source 2, G1 is the group of network elements receiving data from S1, and G2 is the group of network elements receiving data from S2.

Each NE 101-106 may comprise a multicast forwarding information base (MFIB), which may store the NEs PIM group status by making data entries related to all incoming and outgoing PIM join messages. Each NEs MFIB may also indicate whether the NE should receive data packets from an upstream node and replicate the data packets to be sent to multiple downstream nodes or forward the received data packets without replication.

Figure 2:
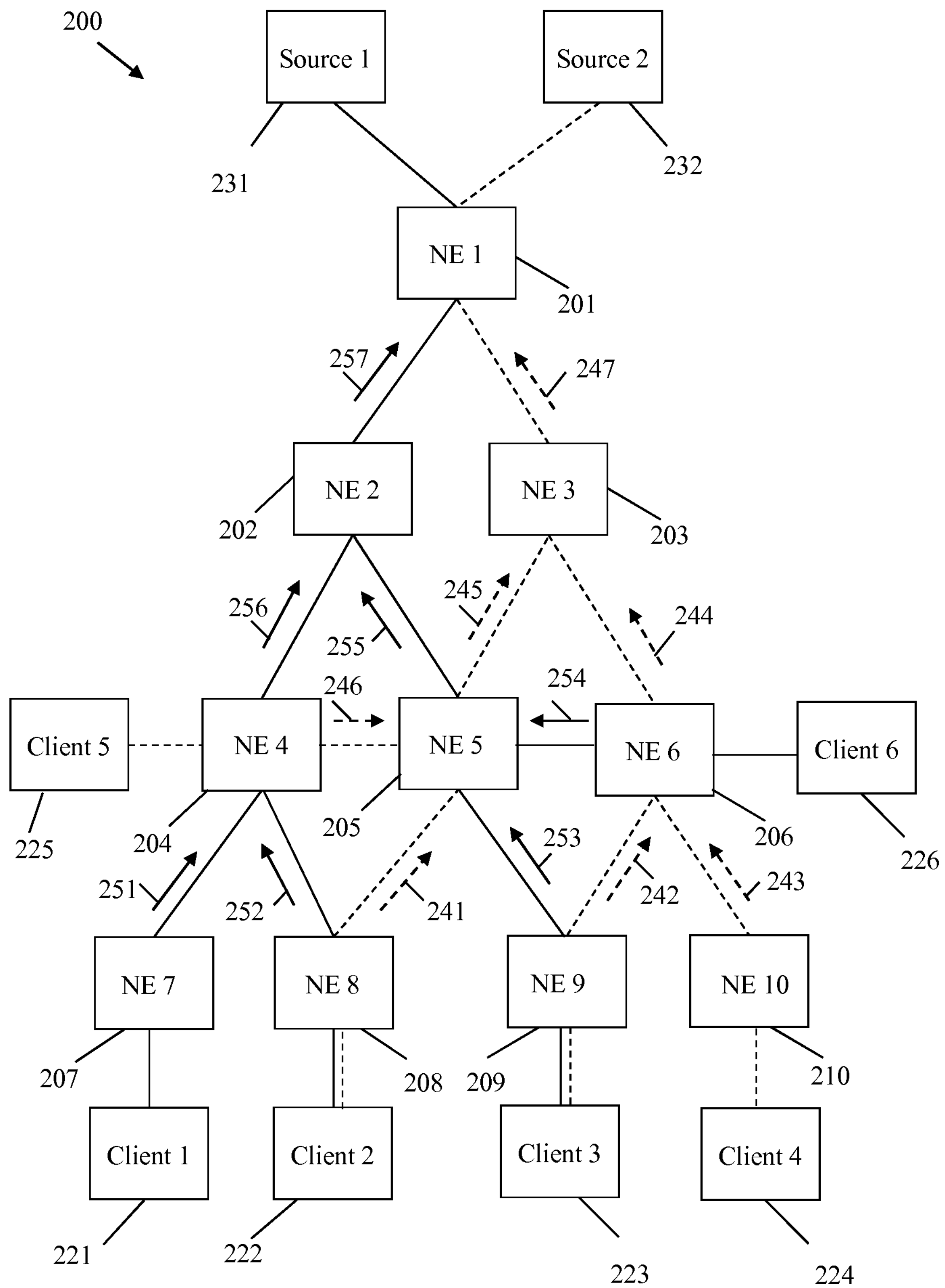
FIG. 2 is a schematic diagram of an embodiment of a multicast network with NEs capable of last hop router discovery.

FIG. 2 is a schematic diagram of an embodiment of a multicast network 200 with NEs capable of LHR discovery. The network 200 comprises substantially the same components as networks 100 in a different configuration. The network 200 may comprise multicast channel source devices 231-232, NEs 201-210, and client devices 221-226 connected as shown in FIG. 2. All connections in network 200 may be bidirectional. NEs 201-210 may collectively be considered a multicast network, for example, a PIM network. The solid lines connecting NEs may illustrate a first multicast tree for multicast channel (S1, G1) and the dashed lines connecting NEs may indicate a second multicast tree for channel (S2, G2), wherein S1 comprises source 231, S2 comprises source 232, G1 comprises NEs 207-209 and 206, and G2 comprises NEs 208-210 and 204. The solid and dashed lines may also indicate the client devices 221-223 and 226 wish to receive communications from channel (S1, G1) and client devices 222-225 wish to receive communications from channel (S2, G2).

As discussed above, the formation of multicast channels may require that LHRs send join messages to FHRs through intermediate network nodes, where an intermediate network node is a multicast network node that is downstream from a FHR and upstream from a LHR. A join message related to a multicast channel may be sent from a LHR and may comprise the unicast network address of that LHR. An intermediate node receiving one or more join messages from downstream nodes may save the addresses of each downstream LHR and the channel or channels the LHR is associated with. If the intermediate node receives multiple join messages, the intermediate node may merge the join messages into a single join message. The intermediate node may then send the merged join message with the addresses of all downstream LHRs and channel associations upstream toward the FHR. In some cases, a LHR may function as an intermediate node to a downstream LHR. The FHR may receive the join messages, may store the LHR addresses and channel associations, and may be aware of all LHRs associated with each channel. The FHR may provide the information to the source, to network management devices, or to users as needed.

Specifically, NEs 207-209 and 206 may transmit LHR addresses to NE 201 (e.g. the FHR) using PIM join messages 251-257, which may be denoted in the form (S1, G1, NEx) where NEx comprises the unicast addresses of all downstream LHRs. NE 207 may send join message 251 (S1, G1, NE7) to NE 204. NE 208 may send join message 252 (S1, G1, NE8) to NE 204. NE 204 may merge join messages 251-252 and transmit join message 256 (S1, G1, NE7-NE8) to NE 202. NE 209 may send join message 253 (S1, G1, NE9) to NE 205. NE 206 may send join message 254 (S1, G1, NE6) to NE 205. NE 205 may merge join messages 253-254 and transmit join message 255 (S1, G1, NE6, NE9) to NE 202. NE 202 may merge join messaged 255-256 and transmit join message 257 (S1, G1, NE6-NE9) to NE 201. NE 201 may receive join message 257 and may store information indicating the LHRs associated with channel (S1,G1). Likewise NEs 208-210 and 204 may transmit LHR addresses to NE 201 (e.g. the FHR) using PIM join messages 241-247. NE 208 may send join message 241 (S2, G2, NE8) to NE 205. NE 204 may send join message 246 (S2, G2, NE4) to NE 205. NE 205 may merge join messages 241 and 246 and may transmit join message 245 (S2, G2, NE4, NE8) to NE 203. NE 209 may send join message 242 (S2, G2, NE9) to NE 206. NE 210 may send join message 243 (S2, G2, NE10) to NE 206. NE 206 may merge join messages 242-243 and transmit join message 244 (S2, G2, NE9-NE10) to NE 203. NE 203 may merge join messages 244-245 and transmit join message 247 (S2, G2, NE4, NE8-NE10) to NE 201. NE 201 may receive join message 247 and may store information indicating the LHRs associated with channel (S2,G2). NE 201 may send (S1, G1, NE6-NE9) to source device 231 and (S2, G2, NE4, NE8-NE10) to source device 232 as needed for a given application using any suitable protocol. Source devices 231-232 may use LHR address information to determine which client devices are accessing the multicast content for use in service related to multicast accounting, billing, and the like. Multicast accounting may comprise determining which LHRs/client devices receive multicast channel data, determining the user associated with the LHR or client device, and billing the user according to multicast channel usage.

A change in network topology may trigger an update of the channel information. For example, client 222 may determine to leave channel (S1, G1) and may indicate the determination using suitable protocols (e.g. MLD and/or IGMP). NE 208 may no longer be connected to a client device that wishes to receive data from (S1, G1), and may send a multicast prune message (S1, G1, NE8) to NE 204. NE 204 may update a locally saved address list and send join message 256 to NE 202 indicating (S1, G1, NE7). Message 256 may be merged with 255 and sent to NE 201 indicating (S1, G1, NE6-NE7, NE9). As another example, the network link between NE 205 and NE 202 may fail. NE 202 may detect the failure, scan a locally saved address list, remove downstream nodes NE6 and NE9 from channel (S1,G1) locally, and send join message 257 indicating (S1, G1, NE7-NE8). NE 202 may also send a prune message requesting NE6 and NE9 be pruned. Each NE receiving the join message 257 or the prune message may also scan a locally saved address list, remove downstream nodes NE6 and NE9 from channel (S1,G1) locally, and send join/prune messages upstream until the entire channel is aware of the link failure and removal of nodes NE6 and NE9. Nodes NE6 and NE9 may then join through another link if able. As a result of this process, a network management device or a system administrator may use LHR address information available at the FHR and the intermediate nodes for failure testing to determine the location of a failed network node, link, or the like. For example, a system administrator may review the LHR address data from each node in a path traversing a multicast tree from an FHR to an LHR. If the LHR address in question appears in a node's address list and does not appear in the address list of an upstream node along the path, a failure may have occurred between the two nodes.

Large multicast networks may require that large numbers of LHR addresses be transmitted toward the FHR. Use of system resources may be reduced by only transmitting the LHR addresses toward the FHR when a change in the network has occurred, such as a change in topology or change in LHR status. Additionally, partial LHR lists may be sent which only comprise addresses of LHRs with a new multicast channel status or that are affected by a topology change. Also, certain LHRs may be designated by the network as important based on the multicast channel being accessed by the LHR, based on the specific characteristics of the LHR, or based on user defined criteria. The network 200 may be configured to only transmit data related to important LHRs to reduce system overhead.

Figure 3:
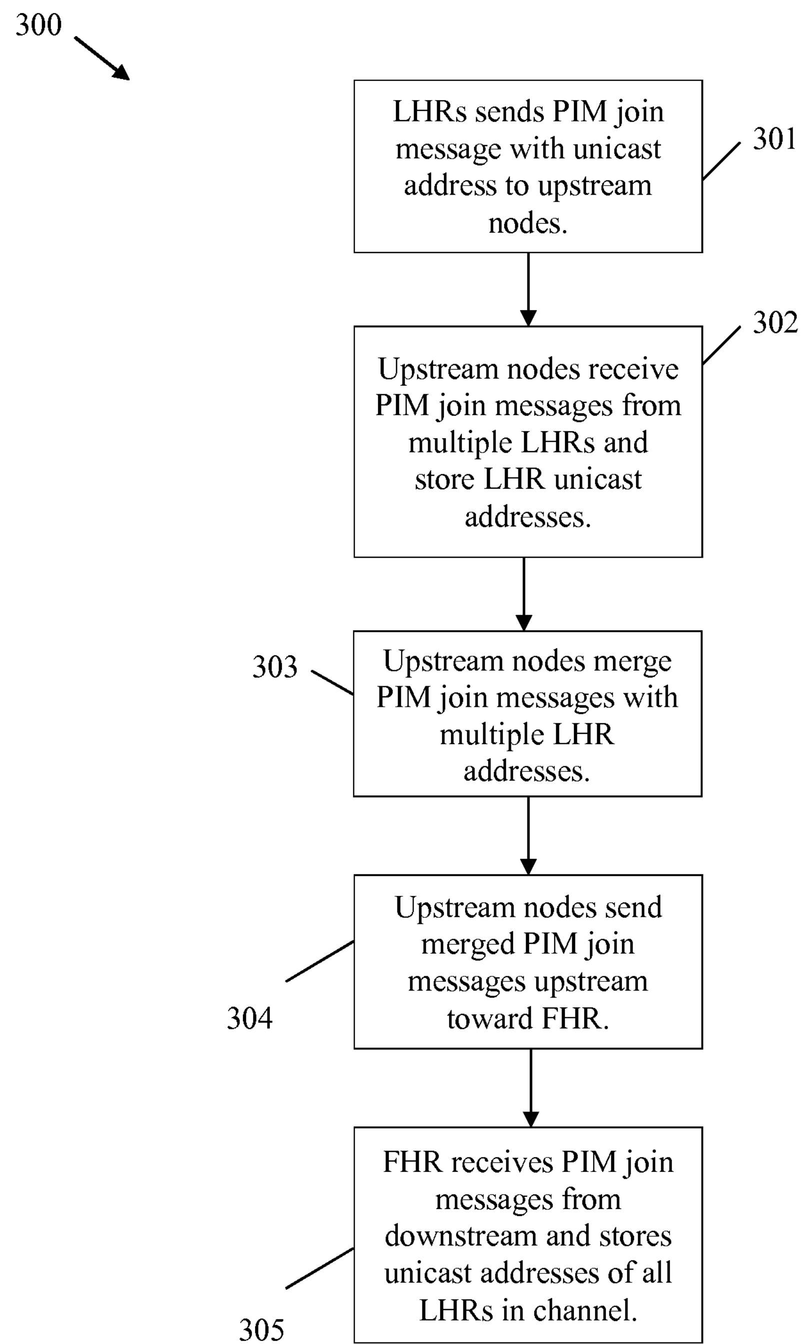
FIG. 3 is a flowchart of an embodiment a multicast LHR discovery method.

FIG. 3 is a flowchart of an embodiment a multicast LHR discovery method 300. In step 301, each LHR in a multicast channel may send a multicast join message, such as a PIM join, upstream to the channel FHR via intermediate nodes. The multicast join message may comprise the transmitting LHR's unicast network address. In step 302, the upstream intermediate nodes may receive the join message or messages from the downstream LHRs. The intermediate nodes may also store the LHR unicast addresses locally. In step 303, the upstream intermediate nodes may merge the multicast join messages received in step 302, which may result in a merged multicast join message comprising the network unicast addresses of the downstream LHRs. In step 304, the upstream intermediate nodes may send the merged join message toward the FHR. Steps 302-304 may be repeated by additional upstream nodes until the merged join message reaches the FHR. In step 305, the FHR receives the join messages from the downstream intermediate nodes. The FHR may then store the unicast addresses for all downstream LHRs.

Figure 4:
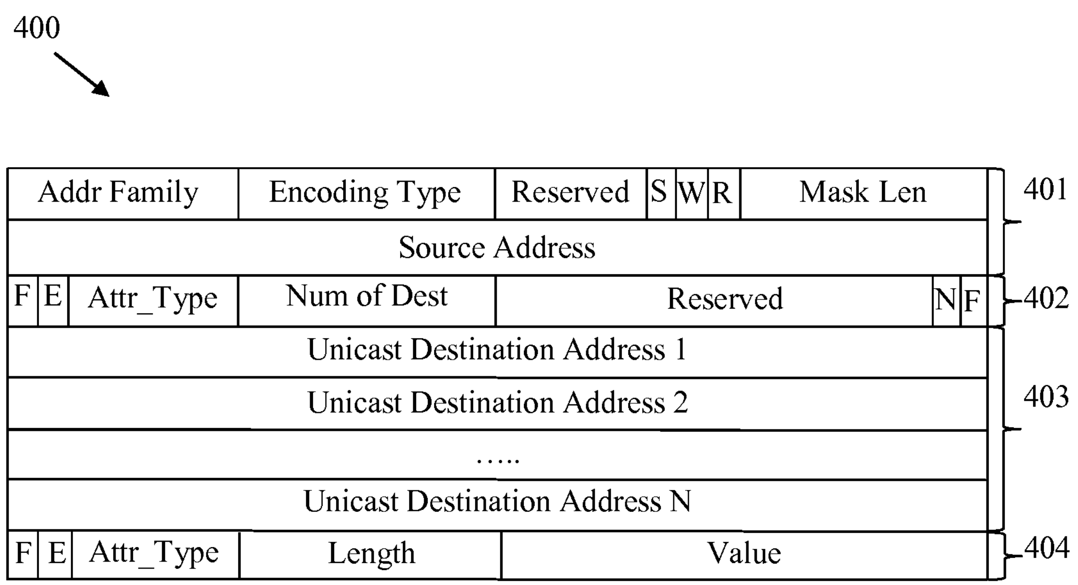
FIG. 4 illustrates an embodiment of an encoding for a PIM join message comprising LHR address data.

FIG. 4 illustrates an embodiment of an encoding for a PIM join message 400 comprising LHR address data. The join message 400 may comprise a plurality of fields in successive thirty two bit sections, wherein each section is numbered from bit position zero to bit position thirty one. The join message 400 may comprise a PIM join header 401, which may be encoded substantially as set forth in IETF documents RFC 5384 and RFC 4601, which are hereby incorporated by reference, and may indicate that the message 400 is a PIM join message for a channel with a given source.

The join message 400 may comprise a destination header 402. The destination header 402 may comprise an F bit and an E bit in bit positions zero and one as disclosed in RFC 5384. The F bit may be set to a value of one to indicate that the message should be forwarded if a NE receiving the message is unable to recognize the message. The destination header 402 may comprise an Attr_Type field which may be six bits long, may extend from bit position two to bit position seven, and may comprise a join attribute value that indicate the destination header 402 is to be used for LHR discovery. The Attr_Type field may be set to a value of three. The destination header 402 may comprise a Number of Destinations field which may be eight bits long, may extend from bit position eight to bit position sixteen, and may comprise data indicating the number of LHR network addresses stored in the join message 400. The destination header 402 may comprise a reserved field which may be fourteen bits long, may extend from bit position sixteen to bit position twenty nine. The destination header 402 may comprise an N flag and an F flag, which may be located at bit positions thirty and thirty one, respectively. The N flag and the F flag may be used for QoS provisioning as discussed in FIG. 7.

The join message 400 may further comprise one or more Unicast Destination Address fields 403. Each Unicast Destination Address field 403 may be thirty two bits long, may extend from bit position zero to bit position 31, and may comprise data indicating the unicast network address of a downstream LHR of the multicast channel associated with the join message 400. The join message 400 may further comprise additional PIM attributes 404 as set forth in IETF RFC 5384.

Figure 5:
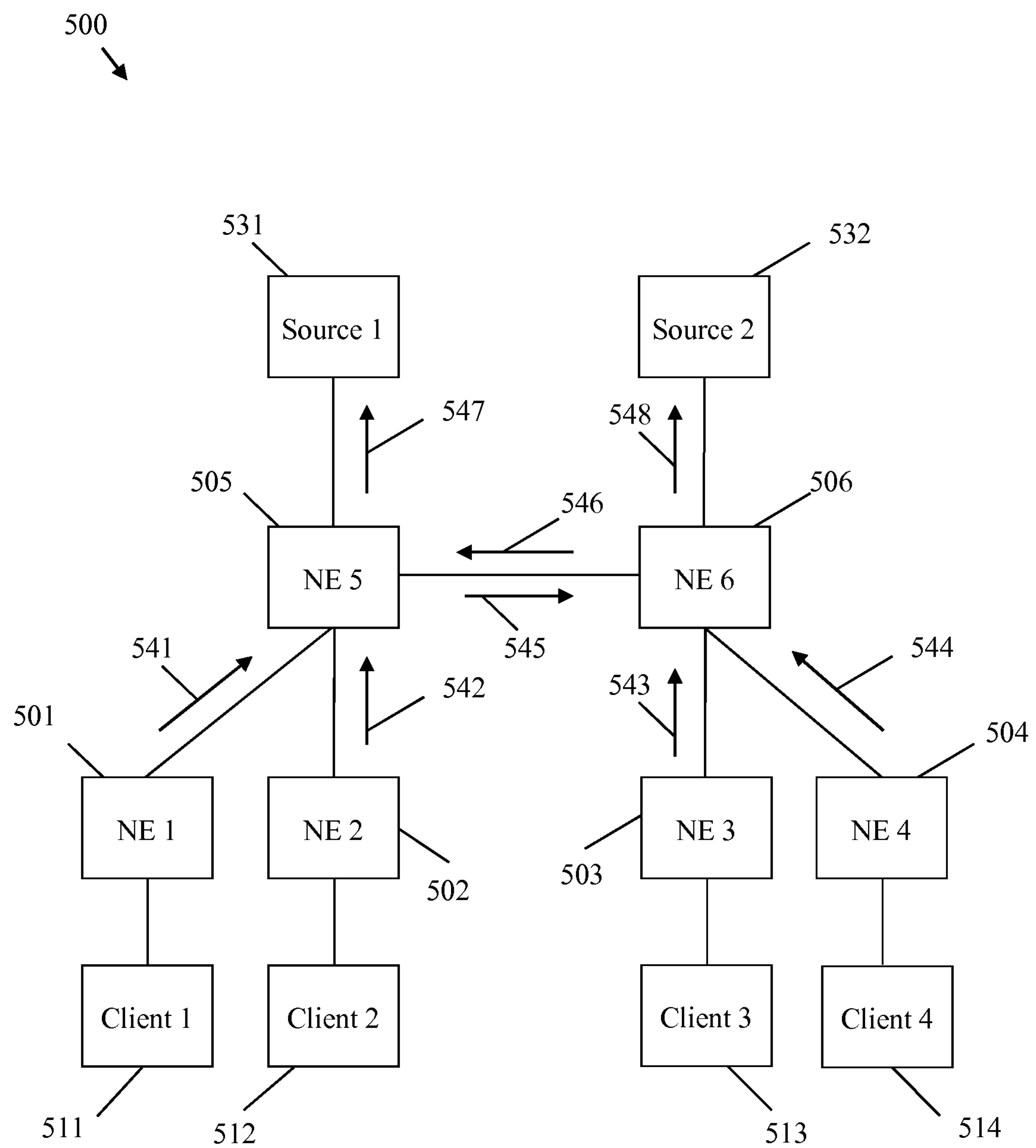
FIG. 5 is a schematic diagram of an embodiment of a network with NEs capable of employing PIM to transmit quality of service (QoS) data.

FIG. 5 is a schematic diagram of an embodiment of a network 500 with NEs capable of employing PIM to transmit QoS data. The network 500 may comprise substantially the same components of network 100 and/or 200, but in a different configuration. As shown in FIG. 5, clients 511-514 may be connected to NEs 501-504, respectively; NEs 501 and 502 may be connected to NE 505; NEs 503 and 204 may be connected to NE 506; NE 505 may be connected to NE 506 and a first source device 531; and NE 506 may also be connected to a second source device 532. NEs 501-504 may be considered LHRs and NEs 505 and 506 may be considered FHRs. The characteristics of network 500 described here apply to a network with any number of source devices, NEs, and client devices.

Network 500 may provide for QoS provisioning. When a NE receives a downstream data packet transmitted over a channel, the NE may receive the packet over an incoming interface, process the packet according to the MFIB including performing any packet replication, and transmit the packet and/or replicated packets over an outgoing interface. The packet(s) may be placed in various buffers and queued for processing and for transmission. If the NE receives more packets than the NE is capable of processing and transmitting, the NEs buffers may run out of space, which may prevent new packets from being stored and may lead to packets being dropped. QoS provisioning may allow a NE to allocate buffer space or other resources for a particular channel. QoS provisioning may also allow a NE to guarantee a particular channel greater queue priority or bandwidth. QoS data may be any data used by the network 500 to perform QoS provisioning and may include, without limitation: maximum bandwidth, minimum bandwidth, maximum packet size, maximum latency, and user defined parameters such as scheduling priority and egress queue depth for downstream packet forwarding and/or replication. A NE 501-506 may consider any QoS data received in performing QoS provisioning. In an embodiment, the NEs 501-506 may consider accumulated latency over multiple hops and/or perform multicast traffic shaping using a leaky bucket algorithm in conjunction with maximum and minimum bandwidth requests.

Clients 511 and 513 may wish to receive data from channel (S1, G1) and clients 512 and 514 may wish to receive data from channel (S2, G2), where S1 is source device 531 and S2 is source device 532. Clients 511-514 may each wish to request QoS provisioning for the data transmitted to them across an associated channel. Each client 511-514 may send QoS data to the NE 501-504, respectively, using IGMP and/or MLD. The LHRs 501-504 may accept the QoS data from clients 511-514, process the QoS data, and transmit the QoS data upstream as part of PIM join messages 541-544. Processing the QoS data may involve determining if local QoS provisioning is possible given current local resources and performing local QoS provisioning. PIM join messages 541 and 543 may indicate that clients attached to NEs 501 and 503 wish to join channel (S1, G1) and include the QoS requirements of clients 511 and 513, respectively. Likewise, PIM join messages 542 and 544 may indicate that clients attached to NEs 502 and 504 wish to join channel (S2, G2) and include the QoS requirements of clients 512 and 514, respectively.

NE 505 may receive join messages 541 and 542, and NE 506 may receive join messages 543 and 544. As NE 505 and NE 506 may both be attached to downstream clients that wish to join both channels (S1, G1) and (S2, G2), NEs 505 and 506 may both send requests to join both channels. NE 505 may send join message 545 to NE 506 as NE 506 is upstream from NE 505 with respect to source device 532 for channel (S2, G2). Likewise, NE 506 may send join message 546 to NE 505 as NE 505 is upstream from NE 506 with respect to source device 531 for channel (S1, G1), join message 546 may carry QoS data from NE 503, and join message 545 may carry QoS data from NE 502. At this point, NE 505 may have received join message 546 from NE 503/506 and join message 541 from NE 501. In order to perform QoS provisioning, NE 505 may select the QoS with the most stringent requirements to ensure that QoS provisioning is sufficient for all requesting nodes. For example, if join message 541 contains the most stringent QoS requirements, NE 505 may provision based on the QoS information received in 541 and send a join message 547 to source device 531 with QoS information based on the QoS information received in 541. Likewise, NE 506 may have received join messages 544 and 545 from NEs 502/505 and 504, respectively. If join message 545 comprises the most stringent QoS requirements, NE 506 may send a join message 548 to source device 532 with QoS information based on the QoS information received in 545. This process may result in multicast trees for (S1, G1) and (S2, G2), wherein G1 equals NE 501, 503, and 505-506, wherein G2 equals 502 and 504-506, 51 equals source device 531, and S2 equals source device 532. This process may also result in QoS provisioning for all client devices 511-514. The provisioned QoS resources may later be released if the client device(s) requiring QoS wish to leave a channel.

PIM QoS provisioning may be implemented in each version of PIM (e.g PIM-SM, PIM-DM, PIM-SSM, and PIM-BIDIR). As PIM-SSM may comprise a single source QoS provisioning may be implemented by placing the QoS data in the PIM join message during multicast tree creation and sending the PIM join message across the multicast tree toward the source address. PIM-SM may have two general embodiments as PIM-SM creates an RP tree and a SPT, which may comprise different root locations. In the first embodiment, the RP may be considered the source address as long as the RP tree is in use. Once RP tree is converted to a SPT, the source may be considered the source address, which may require that the QoS information be refreshed for the SPT. In the second embodiment, the network may only perform QoS provisioning once the source tree is created. PIM-BIDIR may require the PIM join message be forwarded past the RP to the FHR connected to the source. PIM-DM may require that the join message with QoS data be forwarded to the FHR in response to a prune message. Also, in PIM-SM, PIM-BIDIR, and PIM-DM, QoS provisioning to multiple FHRs may be required in cases where more than one source is in use, e.g. the scenario denoted by (*, G).

Figure 6:
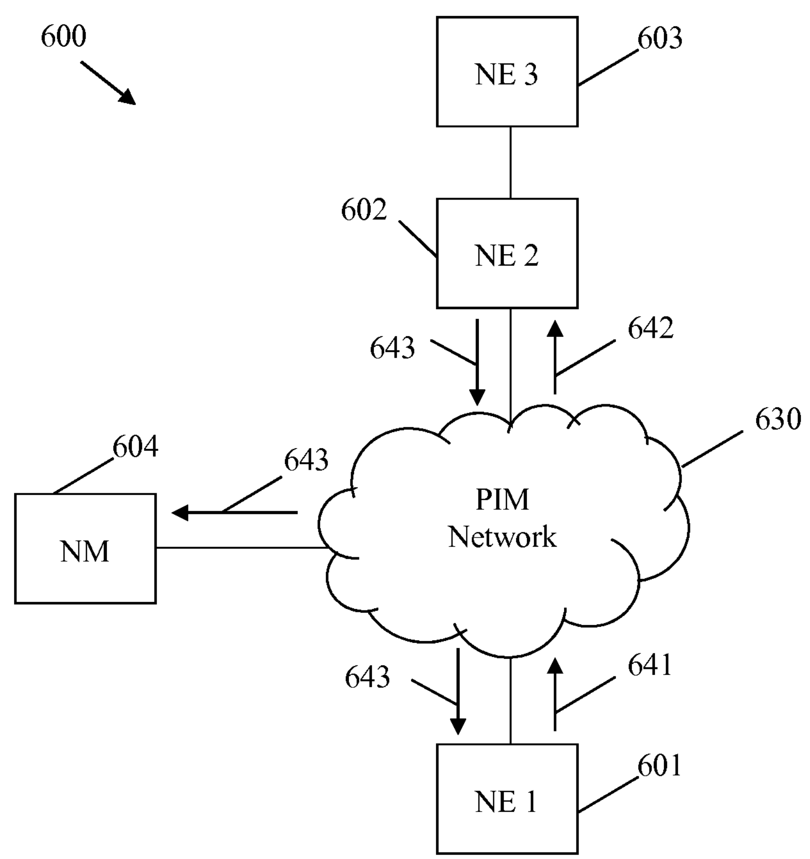
FIG. 6 is a schematic diagram of an embodiment of a network with NEs capable of transmitting PIM QoS fail messages.

FIG. 6 is a schematic diagram of an embodiment of a network 600 with NEs capable of transmitting PIM QoS fail messages. Network 600 may comprise substantially the same components as networks 100, 200, and/or 500 in a different configuration and may also comprise a network management device 604. NE 601 may be connected to NE 603 via PIM network 630 and NE 602. NEs 601-603 may also be connected to the network management device 604 via the PIM network 630. The network management device 604 may be any network node or connected device tasked with managing overall network traffic or reporting network traffic status to network administrators.

A QoS reservation may fail at a node because of insufficient resources to meet QoS provisioning requirements or because an upstream node is not QoS capable. Network 600 may comprise components capable of handling QoS reservation failures. NE 601 may transmit a join message 641 with QoS data to NE 602 through the PIM network 630. Join 641 may pass though one or more NEs in the PIM network 630 and may exit the PIM network 630 as join 642, which may include more stringent QoS data from another NE wishing to join the channel. NE 602 may fail to provision QoS resources due to insufficient resources or because NE 602 is aware that upstream NE 603 is not PIM QoS capable. NE 602 may send a PIM QoS fail message 643 back to NE 601 indicating the failure and the reason for the failure. Alternatively, NE 602 may send a PIM QoS fail message 643 to all downstream LHRs, or all downstream LHRs on a given channel. Additionally or alternatively, the NE 602 may send a PIM QoS fail message 643 to the network management device 604. If the QoS failure was caused by an upstream router without PIM QoS capability, NE 603 may send a PIM join message to NE 603 with or without the QoS data. If the QoS failure was caused by insufficient local resources, depending on the embodiment of network 600, NE 602 may discard the PIM join message 642 or send a PIM join message to NE 603 indicating a QoS failure. Upon receiving a QoS fail message, a NE 601-603 may release any QoS resources that were related to the unsuccessful QoS request.

Figures 7, 8:
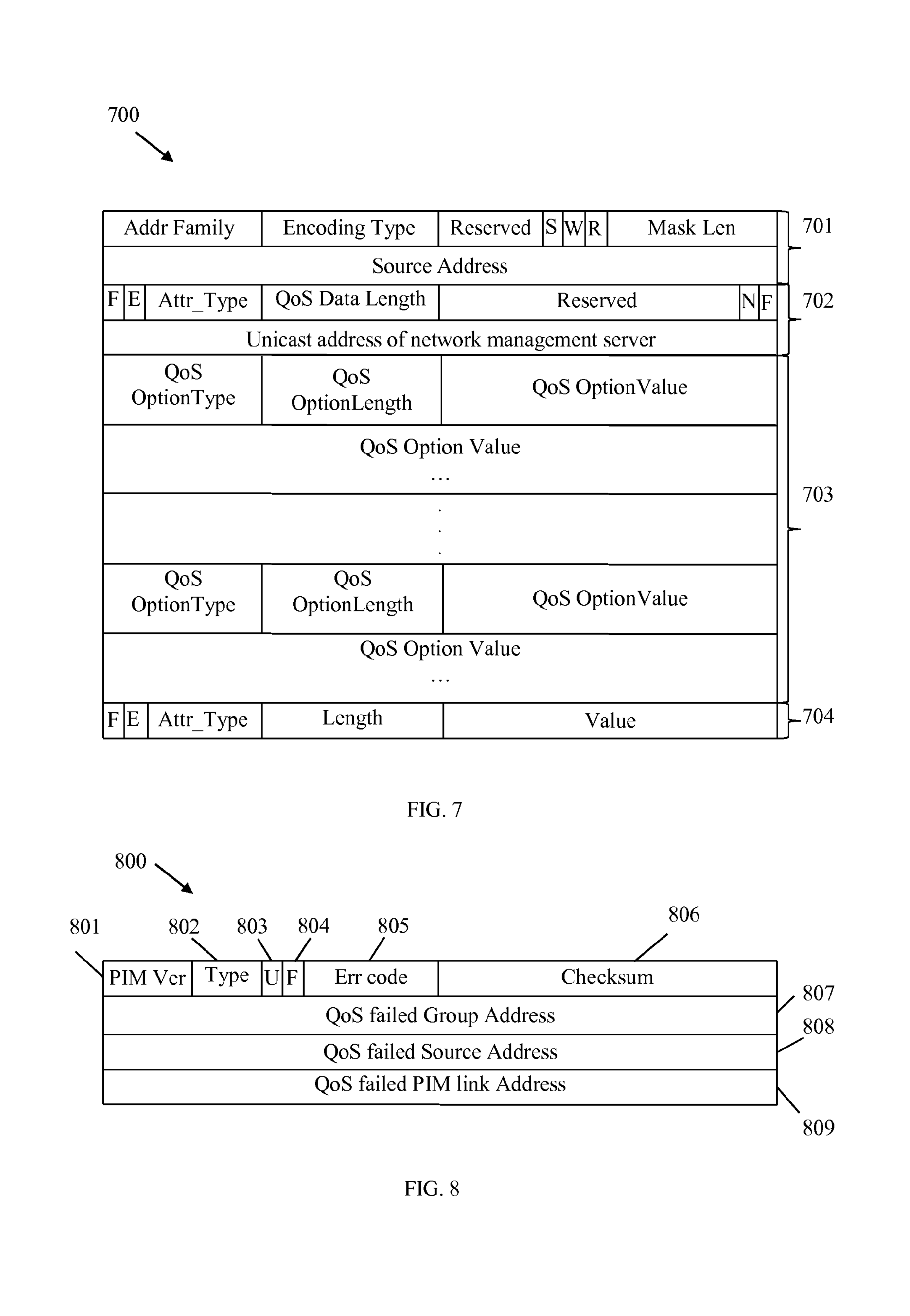
FIG. 7 illustrates an embodiment of an encoding for a PIM QoS join message.
FIG. 8 illustrates an embodiment of an encoding for a PIM QoS fail message.

FIG. 7 illustrates an embodiment of an encoding for a PIM QoS join message 700. The join message 700 may comprise a plurality of fields in successive thirty two bit sections, each section being numbered from bit position zero to bit position thirty one. The join message 700 may comprise a PIM join header 701, which may be encoded substantially as set forth in IETF documents RFC 5384 and RFC 4601, which are hereby incorporated by reference, and may indicate that the message 700 is a PIM join message.

The join message 700 may comprise a QoS attribute 702, which may indicate that the join message carries PIM QoS data. The QoS attribute 702 may comprise an F bit and an E bit in bit positions zero and one as disclosed in RFC 5384. The QoS attribute 702 may comprise an Attr_Type field which may be six bits long, may extend from bit position two to bit position seven, and may comprise data indicating the attribute 702 is a QoS attribute. The Attr_Type filed may be set to a value of two. The QoS attribute 702 may comprise a QoS data length field which may be eight bits long, may extend from bit position eight to bit position sixteen, and may comprise data indicating the length of the QoS attribute 702 and related QoS data 703. The QoS attribute 702 may comprise a reserved field which may be fourteen bits long, may extend from bit position sixteen to bit position twenty nine. The QoS attribute 702 may comprise an N flag and an F flag, which may be located at bit positions thirty and thirty one, respectively. The N flag may be set to indicate a PIM QoS failure message should be sent in case of a PIM QoS failure. The F flag may be cleared to indicate that the join message 700 may not be forwarded to an upstream node if QoS provisioning has failed locally. The QoS attribute 702 may comprise a Unicast Address of Network Management Server field which may be thirty two bits long, may extend from bit position zero to bit position thirty one, and may comprise data indicating the address of the entity that may be notified in the event of a PIM QoS failure (e.g. a network management server or a LHR).

The join message 700 may further comprise QoS data 703, which may indicate the QoS constraints the entity transmitting the join message 700 has requested. The QoS data 703 may comprise one or more QoS parameters. Each QoS parameter may comprise a QoS Option Type field, a QoS Option Length field, and a QoS Option Value field. The QoS Option Type field may be eight bits long, may extend from bit position zero to bit position seven, and may comprise data indicating the type of QoS option that the parameter comprises. The QoS Option Type field may indicate one of a plurality of QoS options, including minimum bandwidth, maximum bandwidth, maximum packet size, maximum latency, and user defined. For example, the QoS Option Type field may be set to one to indicate a minimum bandwidth parameter, two to indicate a maximum bandwidth parameter, three to indicate a maximum packet size parameter, four to indicate a maximum latency parameter, and five to indicate a user defined parameter such as queue type or scheduling priority. The QoS Option Length field may be eight bits long, may extend from bit position eight to bit position fifteen, and may comprise data indicating the length of the QoS parameter. The QoS Option value field may be of variable length, may extend from bit position sixteen to bit position thirty one and may extend to additional thirty two bit segments as needed. The QoS Option value field may comprise data indicating value of the QoS parameter. The join message 700 may further comprise additional PIM attributes 704 as set forth in IETF RFC 5384.

FIG. 8 illustrates an embodiment of an encoding for a PIM QoS fail message 800. The fail message 800 may comprise a plurality of fields in successive thirty two bit sections, each section being numbered from bit position zero to bit position thirty one. The fail message 800 may comprise a PIM Version field 801 which may be four bits long, may extend from bit position zero to bit position three, and may indicate the version of PIM used by the network. The PIM Version field 801 may be set to a value of two. The fail message 800 may comprise a Type field 802 which may be four bits long, may extend from bit position four to bit position seven, and may indicate that the message 800 is a fail message. The Type field 802 may be set to a value of nine. The fail message 800 may comprise a U bit 803 and an F bit 804 at positions eight and nine, respectively. The U 803 bit may be set to indicate that the failure occurred on the uplink and cleared to indicate failure occurred on the downlink. The F 804 bit may be set to indicate that the message 800 is sent in response to a failure and cleared to indicate that the message 800 is being sent in response to a previous failure that has now been corrected. The fail message 800 may comprise an Error Code field 805 which may be six bits long, may extend from bit position ten to bit position fifteen, and may indicate type of QoS failure that has occurred. The Error Code field 805 may be set to a value of one to indicate a minimum bandwidth reservation failure, two to indicate a maximum bandwidth reservation failure, three to indicate a maximum packet size reservation cannot be satisfied, four to indicate requested latency cannot be satisfied, and five to indicate a user defined QoS parameter failure. The fail message 800 may comprise a Checksum field 806 which may be sixteen bits long, may extend from bit position fifteen to bit position thirty one, and may be used for transmission error checking. The fail message 800 may comprise a QoS Failed Group Address field 807 which may be thirty two bits long and may extend from bit position zero to bit position thirty one. The fail message 800 may comprise a QoS Failed Source Address field 808 which may be thirty two bits long and may extend from bit position zero to bit position thirty one. The QoS Failed Group Address field 807 and the QoS Failed Source Address field 808 may be used to indicate the PIM channel and/or (*, G) associated with the failure. The group number of the PIM channel may be encoded in the QoS Failed Group Address field 807, and the source of the PIM channel may be encoded in the QoS Failed Source Address field 808. The fail message 800 may further comprise a QoS Failed PIM Link Address field 809 which may be thirty two bits long, may extend from bit position zero to bit position thirty one, and may indicate the link address of the QoS failure. If the failure occurred because of insufficient local resources, the Failed PIM Link Address field 809 may indicate address of the nodes downstream link. If the failure occurred because an upstream node is not PIM QoS capable, the Failed PIM Link Address field 809 may indicate the address of the nodes upstream link.

Figure 9:
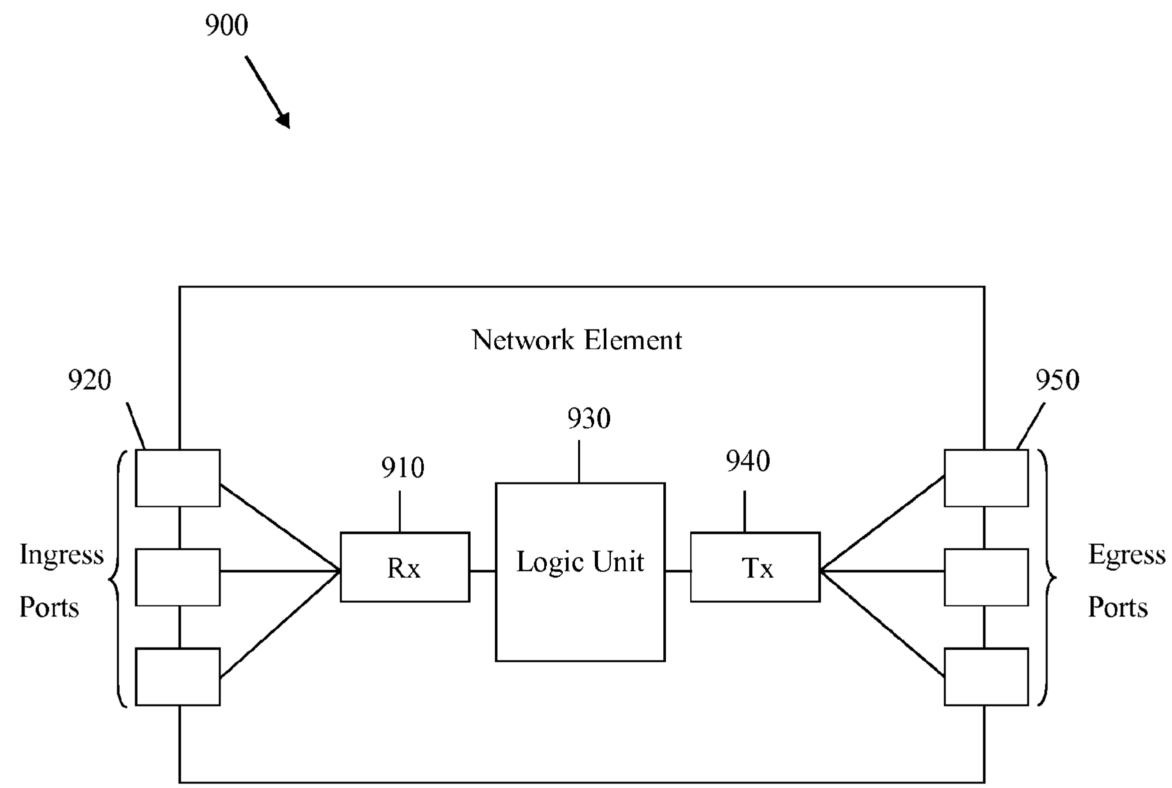
FIG. 9 is a schematic diagram of an embodiment of a network element.

FIG. 9 illustrates an embodiment of a network element 900, which may comprise a processor or a transceiver as described above, e.g., within a network or system. The network element 900 may comprise a plurality of ingress ports 920 and/or receiver units 910 for receiving data, logic unit or processor 930 to process signals and determine where to send the data to, and a plurality of egress ports 950 and/or transmitter units 940 for transmitting data to other systems. The logic unit 930 may comprise a plurality of ingress buffers and a plurality of egress buffers for storing received communications prior to processing and prior to transmission to other systems. The logic unit or processor 930 may be configured to implement any of the schemes described herein, such as the multicast LHR discovery method 300, and may be implemented using hardware, software, or both. For example, the network element 900 may be any NE in a network that implements PIM LHR discovery and/or PIM with QoS as described herein such as illustrative networks network 100-200 and 500-600.

Figure 10:
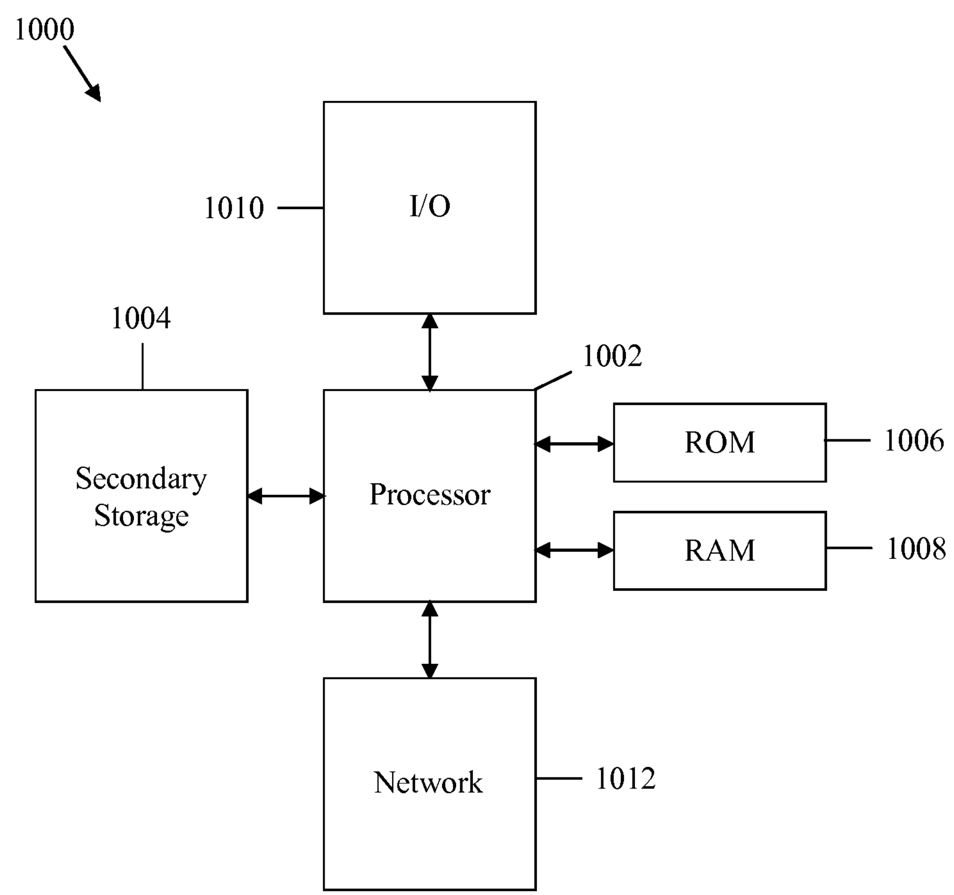
FIG. 10 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 10 illustrates a typical, general-purpose network component or computer system 1000 suitable for implementing one or more embodiments of the methods disclosed herein, such as the multicast LHR discovery method 500. The general-purpose network component or computer system 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, one or more cores (e.g., a multi-core processor), or may be part of one or more application specific integrated circuits (ASICs) and/or digital signal processors (DSPs). The processor 1002 may be configured to implement any of the schemes described herein, including the multicast LHR discovery method 500, which may be implemented using hardware, software, or both. For example, the processor 1002 may include or be coupled to a computer-readable medium, which may be programmed to control the functions of any NE, node, component, or device in networks 100-200 and 500-600.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means +10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:

a first network node configured to transmit a first message to a second network node, wherein the first message comprises data designating the first network node as a member of a first multicast channel, and wherein the first message comprises data indicating a network address of a third network node that is designated as a last hop router (LHR) of the first multicast channel, wherein the first network node comprises a table, and wherein the first network node is further configured to store the network address of the third network node and information indicating that the third network node is the LHR of the first multicast channel in the table.

2. The apparatus of claim 1, wherein the first network node is further figured to delete from the table information related to the third network node if the third network node ceases to be a downstream node or ceases to be a member of the first multicast channel.

3. The apparatus of claim 2, wherein the first network node determines that the third network node has ceased to be a downstream node by sensing a downstream link failure.

4. The apparatus of claim 2, wherein the first network node determines that the third network node has ceased to be a member of the first multicast channel based on information received in a join message or a prune message.

5. The apparatus of claim 4, wherein the first multicast channel and a second multicast channel are a same channel.

6. An apparatus comprising:

a first network node configured to receive a message from a second network node, wherein the message comprises data designating the second network node as a member of a multicast channel, and wherein the message comprises data indicating a network address of a third network node that is designated as a last hop router (LHR) of the multicast channel, wherein the message further comprises a quality of service (QoS) request, and wherein the first network node is configured to transmit a QoS fail message to the third network node if QoS provisioning associated with the QoS request could not be satisfied.

7. The apparatus of claim 6, wherein the first network node is further configured to send the network address of the third network node to a source of the multicast channel for use in multicast accounting.

8. The apparatus of claim 6, wherein the first network node is further configured to send the network address of the third network node to a source of the multicast channel for use in multicast failure testing.

9. A method comprising:

sending, by a first network node, a protocol independent multicast (PIM) join message, wherein the PIM join message comprises a list of network addresses for each PIM channel last hop router (LHR), wherein the list of network addresses is an aggregation of downstream LHR network addresses, wherein the PIM join message is encoded in a type length value (TLV), and wherein the TLV comprises:

an Attribute Type field comprising data indicating that the TLV is a LHR discovery TLV, at least one Unicast Destination Address field comprising a network address of a network node designated as a LHR for a multicast channel, and a Number of Destinations field comprising data indicating the number of Unicast Destination Address fields encoded in the TLV.

10. The method of claim 9, wherein the PIM join message is sent in response to a network link failure, and wherein the network link failure occurs in a downstream link connected to the first network node.

11. The method of claim 9, wherein the PIM join message comprises the network address of one of the PIM channel LHRs if the one of the PIM channel LHRs is designated as an important LHR by a user.

12. A method comprising:

sending, by a first network node, a protocol independent multicast (PIM) join message, wherein the PIM join message comprises a list of network addresses for each PIM channel last hop router (LHR), wherein the list of network addresses is an aggregation of downstream LHR network addresses, and receiving a PIM prune message associated with one of the PIM channel LHRs, wherein the PIM prune message indicates that a client device attached to the one of the PIM channel LHRs has left the PIM channel, and wherein the PIM join message is sent in response to the PIM prune message.

* * * * *